United States Patent [19]

McGraw et al.

[11] 4,162,582
[45] Jul. 31, 1979

[54] FLIGHT TRAINER AND ENTERTAINMENT DEVICE FOR SIMULATING AERIAL ACROBATICS

[76] Inventors: John T. McGraw, 528 Ashwood, Flushing, Mich. 48433; George F. Killeen, 2421 Tandy Dr., Flint, Mich. 48507

[21] Appl. No.: 867,921

[22] Filed: Jan. 9, 1978

[51] Int. Cl.² ............................................. G09B 9/08
[52] U.S. Cl. .................................................. 35/12 N
[58] Field of Search ............ 35/12 K, 12 N, 25, 46 R; 272/1 C, 16-18, 31 A, 31 B

[56] References Cited

U.S. PATENT DOCUMENTS

| | | | |
|---|---|---|---|
| 1,831,939 | 11/1931 | White | 35/12 N |
| 1,987,625 | 1/1935 | Karnes et al. | 35/12 N |
| 2,099,857 | 11/1937 | Link | 35/12 W |
| 2,289,877 | 7/1942 | Dreyer | 35/12 N |
| 2,336,436 | 12/1943 | Beindorf | 35/12 N |
| 2,352,101 | 6/1944 | Hutter | 35/12 N |
| 2,482,115 | 9/1949 | Laird | 35/12 N |
| 2,883,763 | 4/1959 | Schaper | 35/12 N |
| 2,961,778 | 11/1960 | Florez et al. | 35/12 K |
| 3,070,792 | 12/1962 | Neasham | 35/46 R X |
| 3,208,185 | 9/1965 | Silvera | 35/46 R X |
| 3,718,989 | 3/1973 | McKnight | 35/12 N |
| 3,740,469 | 6/1973 | Herndon | 35/12 N UX |
| 3,741,638 | 6/1973 | Geary | 35/12 N |
| 3,974,577 | 8/1976 | Brachlianoff | 35/46 R |

Primary Examiner—Vance Y. Hum
Attorney, Agent, or Firm—Harry R. Dumont

[57] ABSTRACT

A small model of an aircraft is provided in which the operator is seated in the cockpit. The primary flight controls are selectively operable and actuate six variable speed transformers through the movement of control cables operated by the respective flight controls. The amount of current provided by the transformer outputs is directly proportionate to the degree of control movement. The current is used to activate small, variable speed, reversible electric motors which in turn operate rollers set in pairs and aligned on opposite sides in the three primary planes of rotation of a freely movable sphere contained in the forward aircraft housing. In accordance with the forces imparted to the three different controls, movement is transmitted to the sphere. The sphere itself has included within it a plurality of slide projector units each of which will display or project on a single reflective screen a picture of its own particular portion of the sky or ground. A sufficient number of slides and projectors are included to give a universal or complete coverage in all directions. The trainer thus provides appropriate visual displays and sensations simulating loops, slow rolls and the like in response to control movements of the operator and allows the operator to experience visually the results of his own control motions.

7 Claims, 8 Drawing Figures

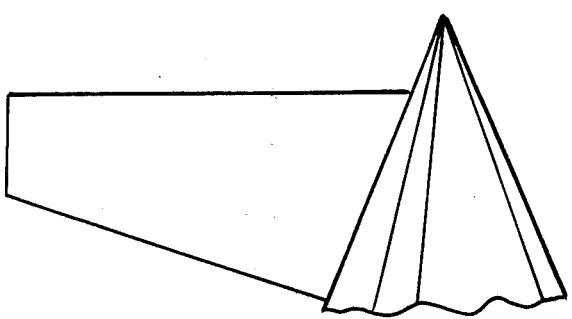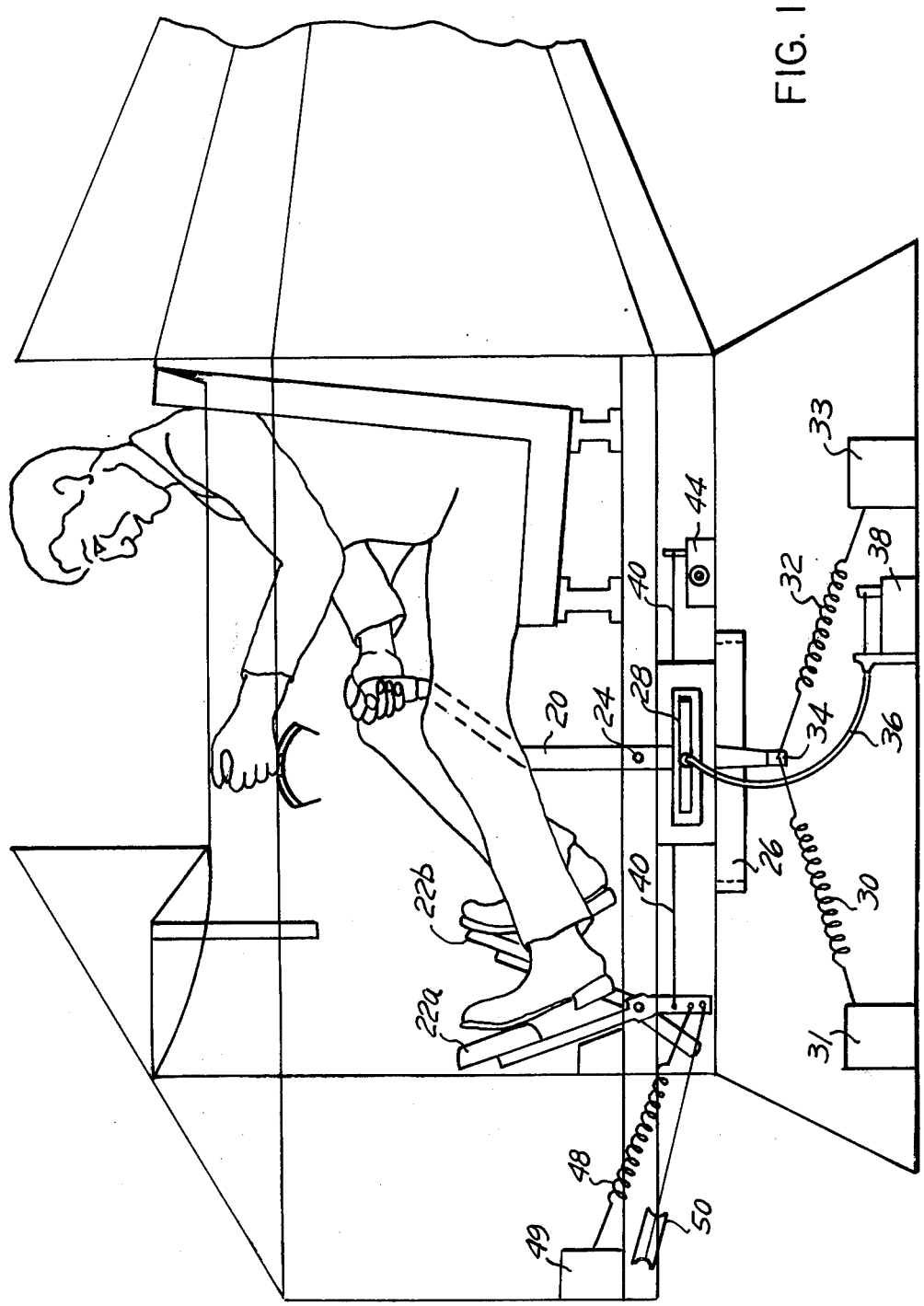
FIG. 1

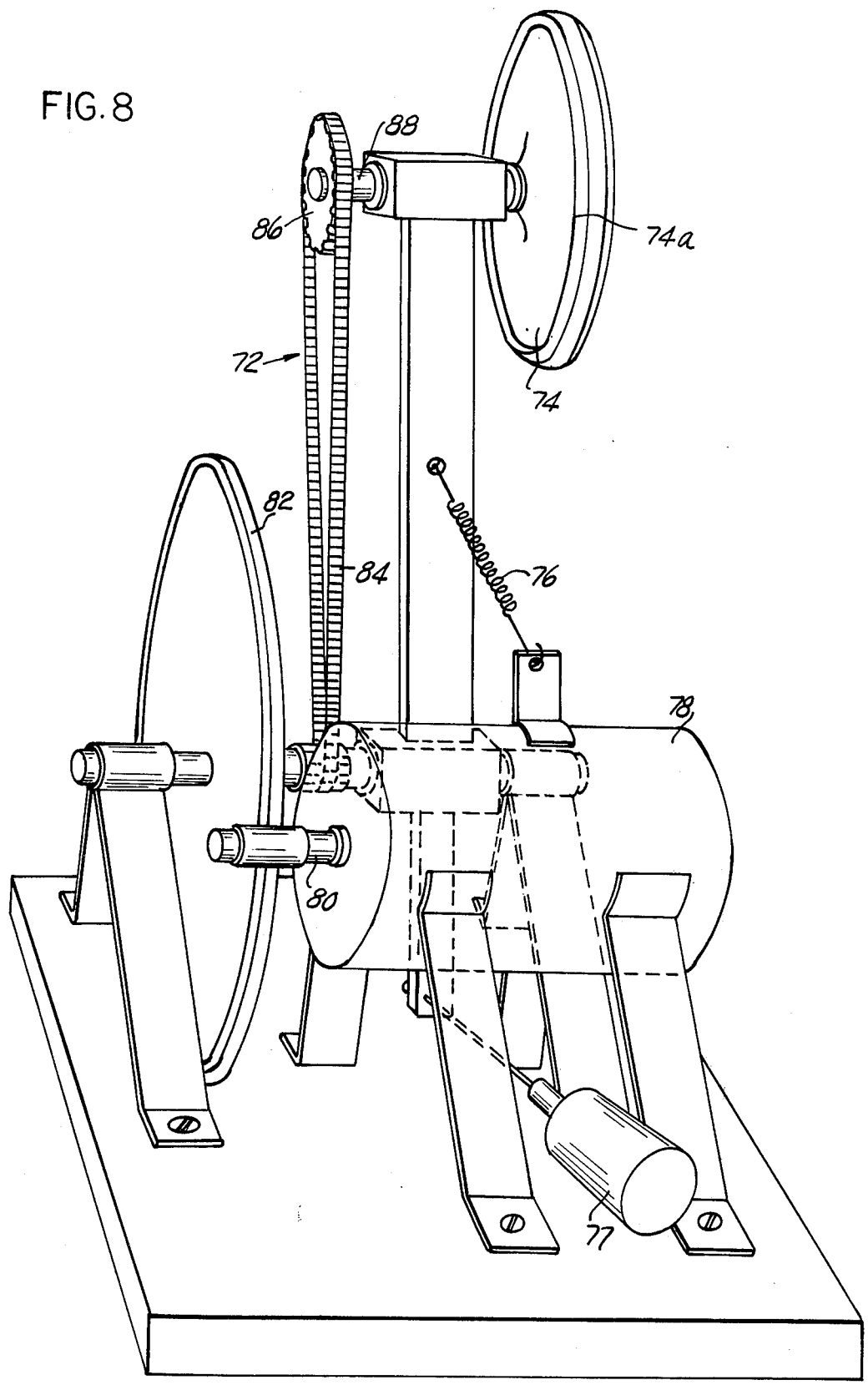

FLIGHT TRAINER AND ENTERTAINMENT DEVICE FOR SIMULATING AERIAL ACROBATICS

DESCRIPTION OF THE PRIOR ART

The prior art includes a number of different flight trainers to be used in pilot training or to simulate such so as to provide entertainment through the visual sensation of flying. U.S. Pat. No. 1,831,939 issued on Nov. 17, 1931 to White for "Apparatus for Training Student Pilots of Aircraft" discloses a hemispheric screen on which there is provided a shiftable panorama operable by control of the instructor rather than the operator. U.S. Pat. No. 1,987,625, issued on Jan. 15, 1935 to Karnes et al for "Chamber for the Projection of Multiple Image Records" discloses an image projection system for pilot training in which a plurality of projectors are used to project different partial images on screens positioned around the pilot seat. U.S. Pat. No. 2,883,763 issued on Apr. 29, 1959 to Schaper for "Carrier Landing Trainer" shows a complex system including a plurality of projectors which are mounted above the operator's head on a gimble supported platform. U.S. Pat. No. 2,352,101 issued on June 20, 1944 to Hutter for "Pilot Trainer" shows a pilot trainer set-up in which a closed sphere is used and selectively positioned in accordance with the operator's controls. The sphere itself has painted on one half a ground scene and on the other half a sky scene and the two are selectively projected on a separate screen. U.S. Pat. No. 2,099,857 issued on Nov. 23, 1937 to Link for "Trainer for Avaitors" shows the typical complex Link system in which the trainer is itself physically rotated and tilted to simulate the normal flying position of an airplane.

BRIEF DESCRIPTION OF THE DRAWINGS

The invention will be described in its preferred embodiment with reference to the following drawings wherein:

FIG. 1 is a front elevational view of the trainer aircraft with parts broken away;

FIGS. 7 and 8 are elevational and perspective views, respectively, showing parts of the motor drive system for the sphere.

DETAILED DESCRIPTION OF THE PREFERRED EMBODIMENT

Figure 2:
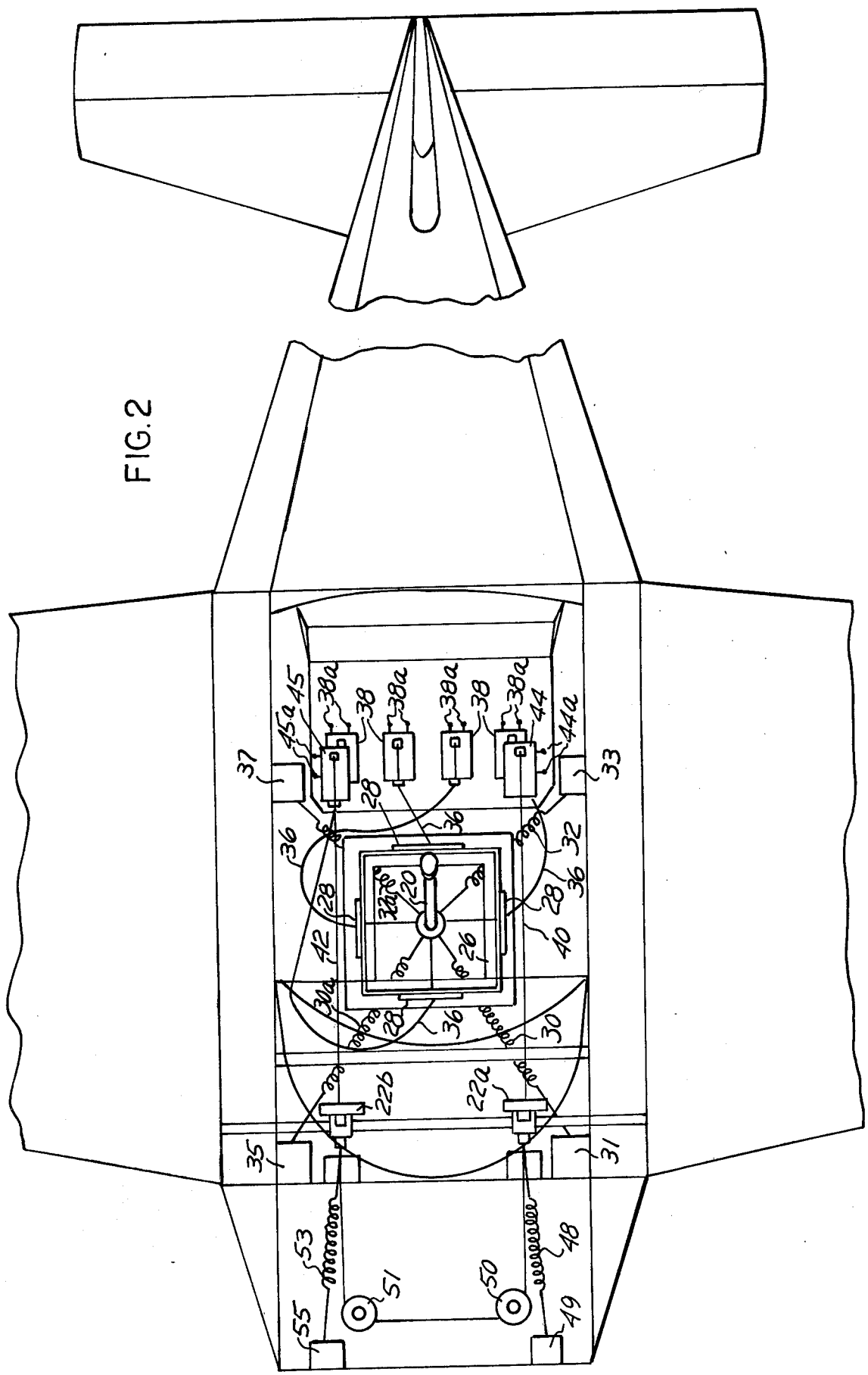
FIG. 2 is a fragmentary top plan view of the trainer aircraft.

FIG. 1 illustrates the basic parts of the trainer aircraft and shows the operator seated in the cockpit. Included among the manually operated controls are the stick 20 and a pair of reciprocally moveable rudder pedals 22a, 22b. Associated with the stick 20 is a pivotal mounting base 24. A set of stick limits 26 are positioned forwardly, rearwardly laterally of the stick 20 as shown. Also a pair of centering tension springs 30 and 32 are attached respectively between the lower end 34 of the stick 20 and mounting blocks 31, 33. A total of four different stick associated control cables 36 are included in the system as will be better shown in FIG. 2 hereinafter. A set of four variable current transformers 38 actuated by the stick 20 are included in the electrical control system as will also be shown in FIG. 2 hereinafter.

With respect to the rudder pedals 22a, 22b, these have associated with them control cables such as cable 40 which serve to control two additional variable current transformers 44. The manner in which the several control cables are coupled in the system will be further explained in connection with FIG. 2 hereinafter. Also associated with the rudder pedal 22a are a spring 48 and a roller 50 which provides yieldable mechanical resistance to movement of the pedal and thus furthers the illusion of actual operating controls. The main sensations of aerial acrobatics provided by our flight trainer are given visually through projections from a slide projector on a screen 52 as will be shown in FIG. 6 hereinafter. A plurality of slide projectors 58 are positioned in a sphere 56 positioned forwardly in the aircraft in a manner also to be shown in FIG. 6.

FIG. 2 illustrates with more completeness the interrelationship between the manually operated controls and the electrical controls included in the form of variable current transformers. The stick 20 is centered by four springs 30, 32, 30a and 32a, diagonally arranged and each anchored to a block 31, 33, 35 and 37, respectively.

Associated with the left hand rudder pedal 22a are the spring 48, the pulley 50. The left hand end of spring 48 is fixed to the mounting block 49. Associated with the right hand rudder pedal 22b is a pulley 51 and a spring 53 having its left hand end attached to the block 55. At the right hand side of the control cable arrangement, it will be seen that the cable 40 asociated with the left hand rudder pedal 22a operates the moveable element of a variable current transformer 44 having a pair of output terminals 44a. The right hand rudder pedal 22b through its cable 42 operates the moveable element of a variable current transformer 45 having a pair of output terminals 45a.

With respect to the stick 20 it is held centered by the arrangement of springs and mounting blocks as shown. The set of four cables 36 are each connected to a different moveable element of four variable current transformers 38 as shown so that responsive to the selected movements of the stick 20 there will be provided four different variable magnitude current outputs from the different output terminal pairs 38a as shown. In each case there is provided along with the pedals 22a, 22b and the stick 20 an elastic resistance to any and all of the control movements made by the operator. Also it will be seen that the amount of current provided from the output terminals of each transformer 38 is directly proportionate to the degree of controlled movement made by the operator. This current in turn is used to control the movement of the sphere 56 which will be shown in FIGS. 3, 5, and 6 hereinafter. A set of four slides 28 are included in opposed pairs to keep fore and aft control stick movements from actuating lateral control movements and vice versa.

Figure 3:
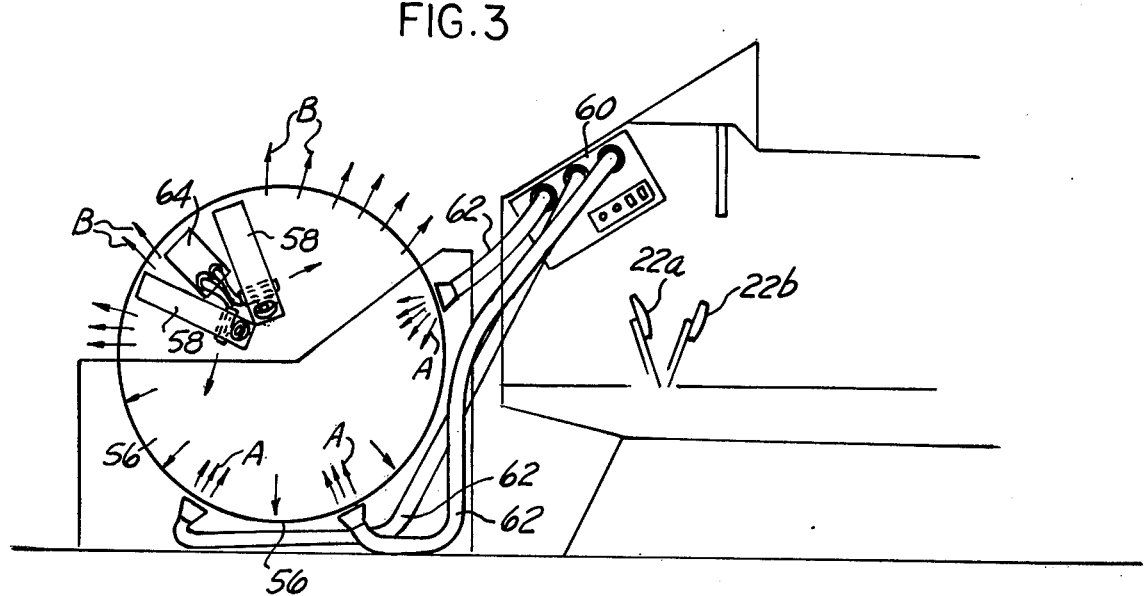
FIG. 3 is a partial view showing the sphere and its associated cooling mechanism and electrical system.

FIG. 3 shows the manner in which the sphere 56 is positioned in the aircraft forwardly of the cockpit. A plurality of projectors 58, twelve in number, are arrayed inside the sphere 56 in a manner better to be shown in FIG. 5 hereinafter. Because of the containment of the large number of projectors 58 within the sphere 56 a large amount of heat is accumulated which must be removed in the manner shown. A source of refrigerated air 60 is communicated through a plurality of ducts 62 to small openings at different points about the periphery of the sphere 56 to admit pressurized cooled air in the direction shown by the arrows A. At the same time, there is included on the sides of the sphere 58 a plurality of fans or blowers 64, one for each two projectors 58, which provide an exhaust flow of heated air indicated by the arrows B outwardly from the sphere 56 through a plurality of small opening therein, not shown. This air flow path insures positive circulation through the bases of the projectors 58.

Figure 4:
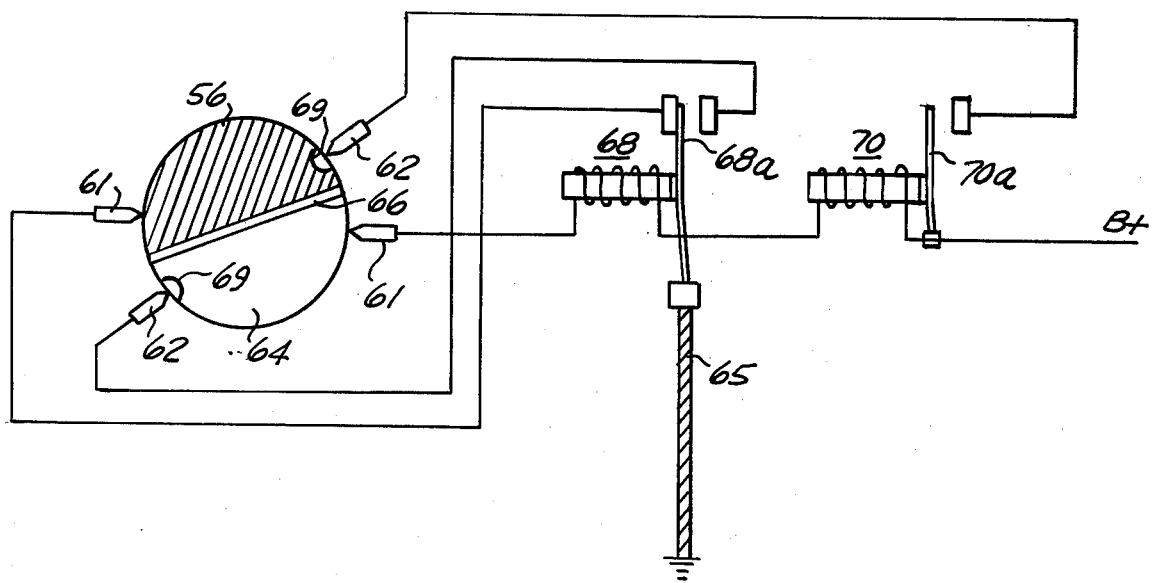
FIG. 4 is a partial schematic view showing the control whereby the sphere used in the trainer aircraft is operated.

FIG. 4 shows the electrical distribution system for introducing into the sphere 56 the high power required for the operation of the projector 58. Since the sphere 56 must be entirely free to rotate, nothing can be rigidly attached or fastened to it. Power input is given to the sphere 56 by springloaded single brushes 61, 62 arranged in opposed pairs as shown. in the circuit of FIG. 4, ground potential is indicated at the base of the lead 65. Power input is from a DC source indicated by B+ at the right hand end of FIG. 4. It will be seen that the sphere 56 includes a pair of hemispheric portions 64 made of material of a high current conductivity such as copper. The two conductive halves 64 are separated one from the other by an insulating ridge of plastic 66. The insulating ridge 66 is sufficiently wide so that the brush pairs 61, 62 cannot short across the insulating barrier thus formed. Transparent lens caps 68 are provided over each projector lens opening to maintain globular integrity for the driving rollers associated with the sphere 56. Since the power circuit would be broken if the input or output brushes encounter a non-conductive lens cap, two alternate power flow paths are provided with an automatic relay switching system as shown in FIG. 4. The system includes relays 68 and 70. Associated with the coil of relay 68 is a moveable contact 68a which is normally in its left hand moved position as illustrated. The right hand relay 70 normally has its moveable contact 70a in the left hand or open position illustrated. Whenever two of the opposed brushes such as 62 encounter lens caps 69 at the same time, the right hand relay 70 will be in its open position while the left hand relay 68 will be in its position as shown with power input to the brushes 61 and on out to ground through the lead 65 as shown. If the two brushes 61 should contact lens caps 68 then the path of power conduction would be through a closed contact 70a through the brushes 62 and thence through the conductor 65 to ground.

It will be understood that in the cooling and electrical conduction systems of FIGS. 3 and 4, small openings are provided about substantially all the surface of the sphere 56 with the diameters of the openings being substantially less than the diameter of the brushes 61, 62. The flow of cool air in the direction of arrows B as shown in FIG. 3 are through similarly small perforations provided in the periphery of the sphere 56.

Figure 5:
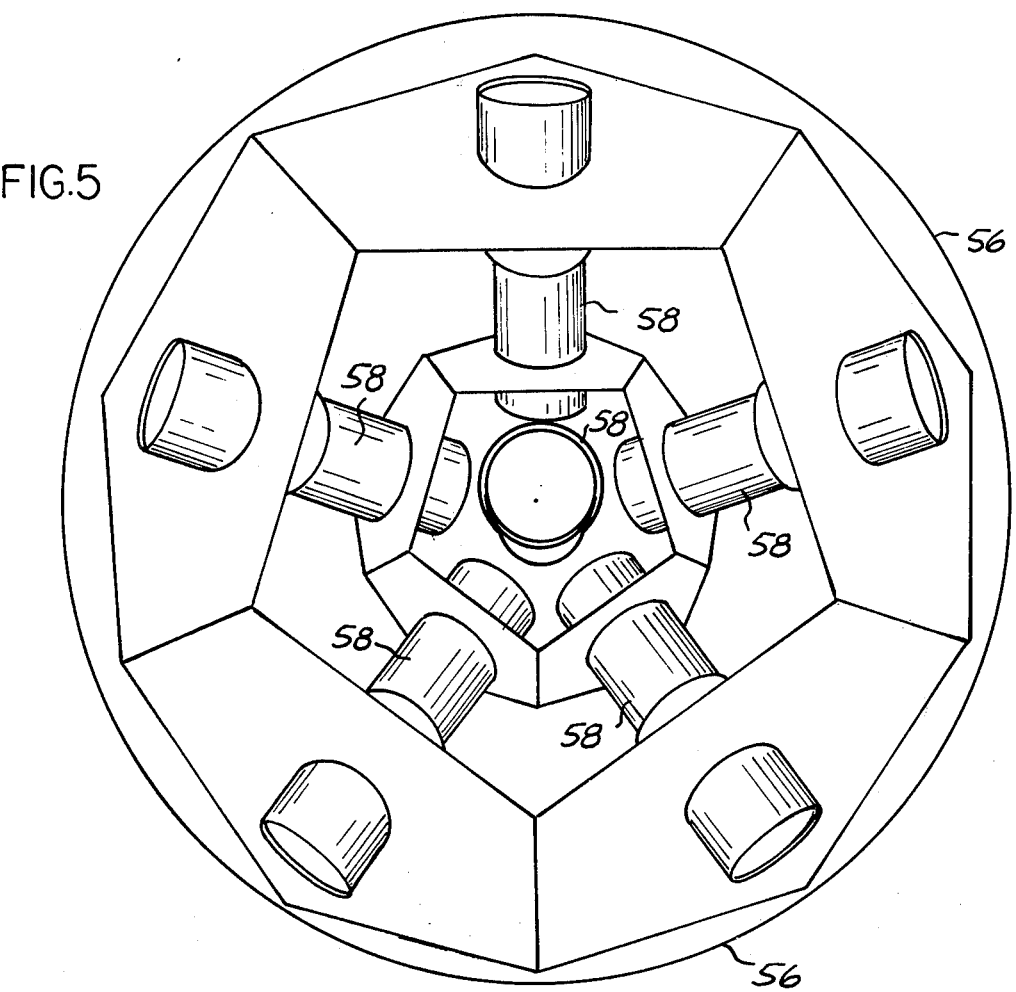
FIG. 5 is a view showing the manner in which slide projectors are mounted in the sphere.
Figure 6:
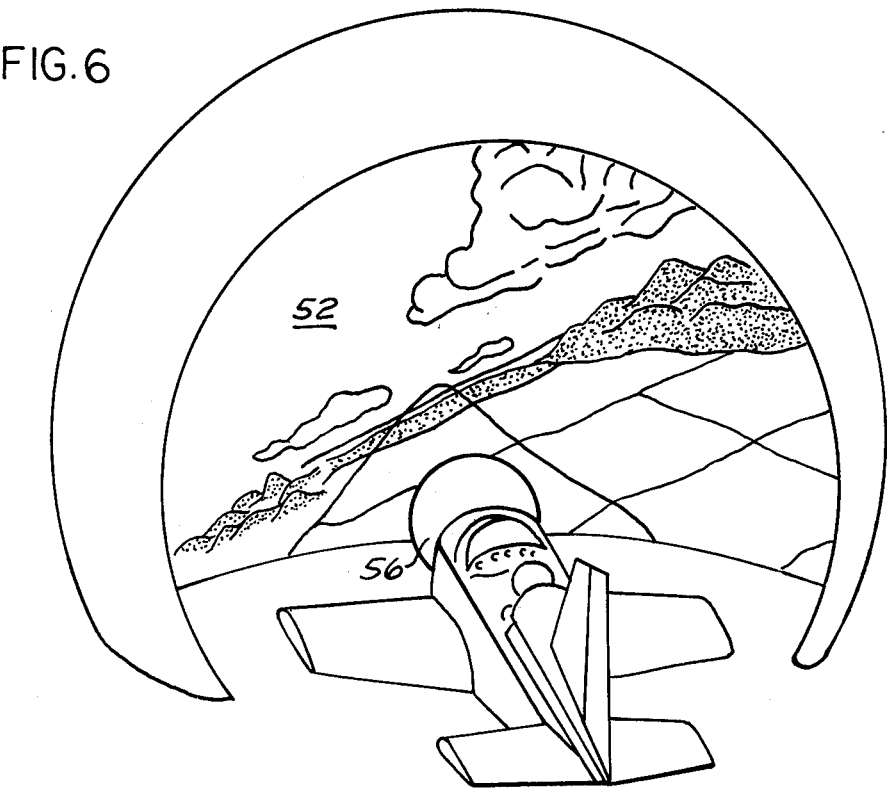
FIG. 6 is a general view showing the screen on which the slide pictures are projected forwardly of the trainer.

Reference is now made to FIGS. 5 and 6 for their showing of the mounting of six of the twelve projectors 58 inside the sphere 56. The screen 52 as illustrated in FIG. 6 is arranged forwardly of the aircraft as a partial spherical screen with the diameter of the order of ten feet with each point on the screen 52 being approximately 45 inches from a corresponding point on the sphere 56. In this particular configuration, twelve projector 58 heads using 21 mm projection lenses, each with an angle view of approximately ninety one degrees (91°) will give universal coverage with approximately seven degrees of cushion for masking and matching. The duo-decahedron shape is designed and shown for supporting the projectors 58 within the sphere 56. The projection units 58 may be of a type well known in the trade consisting of a linear arrangement of a high intensity light source, light diffuser, slide holder and projection lens. In the interest of simplification and brevity, the internal details of these well known devices are not shown.

Figure 7:
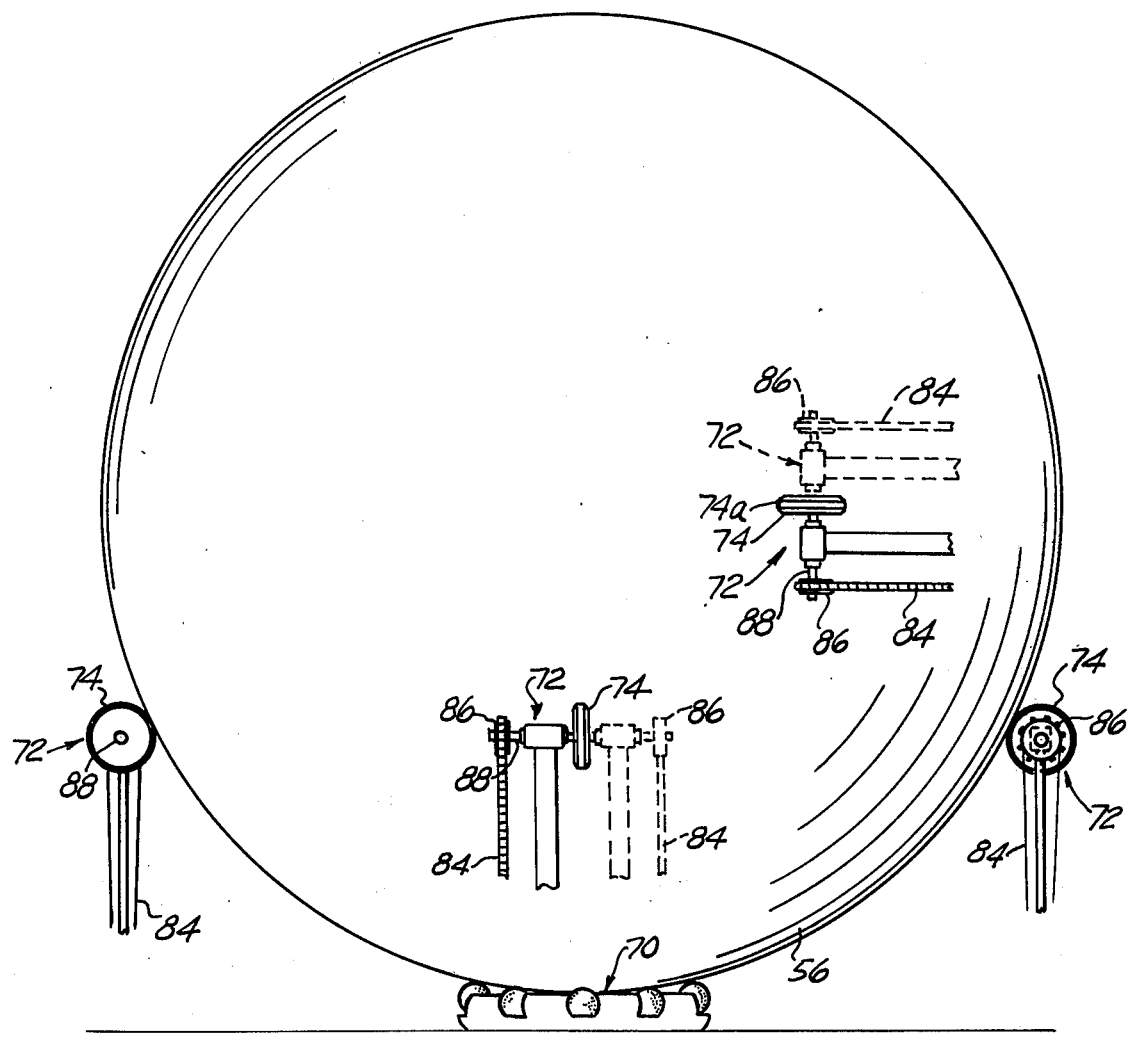

FIGS. 7 and 8 illustrate the drive system for the sphere 56. The sphere 56 is supported by a plurality of electrically non-conductive ballbearing races 70 at its base and also at its sides, not shown. The drive assemblies 72 are arranged in opposed pairs and oriented in the manner shown in FIG. 7 with alignment on the three primary planes of rotation of the sphere 56. Each drive assembly 72 includes a drive roller 74 which is engageable against the periphery of the sphere 56 in driving relationship. Each drive rotor 74 is further moveable into engagement with the sphere 56 through the operation of a solenoid 77 as will be better shown in FIG. 8 hereinafter. It will be understood that when two or three sets of drive assemblies 72 are in operation simultaneously, the motion imparted to the sphere 56 is the moment or product of all the rotating rotors 74. Upon interruption of current to any of the motor-solenoid combinations, a return spring 76 provides a force to remove the particular drive assembly 72 from the sphere 56 to avoid scuffing.

Reference is now made to FIG. 8 for a description of one of the six opposed pair of drive assemblies 72. Each of these includes a reversible electrical drive motor 78 which receives a current at its input terminals from the output terminals 38a, 44a and 45a, respectively, of the associated variable current transformer 38, 44 and 45 as shown in FIG. 2. Responsive to the magnitude of current output from each of the above several transformers, the operative drive assembly 72 will be forced into driving relationship with the periphery of the sphere 56 through the operation of an associated solenoid 77. The solenoid 77 when energized will tilt its associated rotor 74 into driving engagement with the sphere 56. Each drive rotor 74 preferably has a deflectable material ring 74a such as rubber mounted above its periphery. Drive is communicated from the output shaft 80 of each motor 78 through a reduction drive disc 82 and thence through a belt drive 84 to the left hand drive wheel 86 and through the shaft 88 to the drive rotor 74. Thus each drive rotor 74 will be driven with a speed and in a direction which is representative of the current output from its associated variable current transformer. Current output from such transformer again is proportional to the control movement magnitude given to the manual controls by the operator.

It will be appreciated that the sphere 56 is the basic operating element of the system and is fabricated in a rigid shape to make possible its own free rotation by the several rollers. Each of the several slide projectors 58 will project or display on the reflective screen 52 a picture of its own particular portion of the sky or ground. A sufficient number of slides and projectors are contained within the sphere 56 to give a universal display of complete coverage in all directions. Each projected picture is positioned to match along borders with its neighbor pictures. The required matching of adjoining pictures is simply accomplished by taping or masking of the slides themselves.

It will thus be seen that we have provided by our invention a novel and improved aircraft trainer device which is also readily adaptable to amusement or entertainment uses. The acrobatic experience and sensation conveyed to the operator is primarily visual. There is actually little real feeling of motion experienced in co-ordinated maneuvers, except as is arrived at by interpreting the visual clues. The present trainer produces appropriate visual cues and displays in direct response to control movements and prompts the operator to experience in a very real way his own control motions and the results of those motions.

We claim:

1. In a flight trainer type aircraft having mechanism simulating that of an aircraft and including simulated airplane manual controls; a partial spherical shaped screen located forwardly relative to the aircraft where views projected thereon may be seen by the operator of the controls; a sphere located forwardly of the aircraft; support means for said sphere for permitting its rotation in three control planes; a plurality of projectors mounted inside said sphere for rotation therewith and for projecting adjacent sectorial views on said screen; and electrical drive means connected intermediate said controls and said sphere for rotating said sphere and said projectors in said planes in unison with the operation of said controls to simulate aerial acrobatics, said sphere including two electrically conductive parts, means for insulating one part from the other; an electrical power supply; and means for electrically connecting at least one of said parts and their associated projectors to the power supply in all positions of the sphere.

2. In a flight trainer type aircraft having mechanism simulating that of an aircraft and including simulated airplane manual controls; a partial spherical shaped screen located forwardly relative to the aircraft where views projected thereon may be seen by the operator of the controls; a sphere located forwardly of the aircraft; support means for said sphere for permitting its rotation in three control planes; a plurality of projectors mounted inside said sphere for rotation therewith and for projecting adjacent sectorial views on said screen; an electrical power supply; means for electrically connecting the power supply to the sphere and thus to the projectors; and electrical drive means connected intermediate said controls and said sphere for rotating it and said projectors in said planes in unison with the operation of said controls to simulate aerial acrobatics; said sphere including two electrically conductive material halves to facilitate passage of operating current from said power supply to said projectors, said halves separated by an insulating circumferential ridge.

3. The combination as set forth in claim 1 wherein said support means for said sphere comprises a plurality of ball-bearing races arrayed on the base and at the sides of the sphere.

4. The combination as set forth in claim 1 wherein said controls are spring-biased to provide resistance to their movement by said operator.

5. The combination as set forth in claim 1 wherein a flow of pressurized cooled air is provided through the interior of said sphere for cooling it and said projectors during their operation.

6. The combination as set forth in claim 5 wherein a plurality of relatively small openings are provided through the periphery of said sphere for allowing said flow of pressurized cooled air therethrough.

7. The combination as set forth in claim 1 wherein said spherical shaped screen partially encloses said aircraft on its forward sides to further the illusion of motion given by the views projected.

* * * * *